Aug. 8, 1967  D. E. KROPP ETAL  3,334,870
h BAFFLE

Filed April 21, 1966

INVENTORS
DONALD E. KROPP
HENRY G. MELINO
BY  DONALD E. DIEHL

Theodore B Roessel
ATTORNEY 3,334,870
h BAFFLE
Donald E. Kropp, Pittsford, and Henry G. Melino and Donald E. Diehl, Rochester, N.Y., assignors to Ritter Pfaudler Corporation, Rochester, N.Y., a corporation of New York
Filed Apr. 21, 1966, Ser. No. 544,223
4 Claims. (Cl. 259—108)

ABSTRACT OF THE DISCLOSURE

A glass coated baffle of h configuration, top suspended in a mixed vessel, provides "Venturi" mixing of fluids in addition to common baffle mixing throughout its length from the point of attachment of its depending legs to their separated ends so as to mix capacity and less than capacity volumes of fluid such as when filling and emptying the vessel.

---

This invention relates to baffles for use in combination with vessels having agitating or mixing devices, and more particularly relates to glass-coated baffles.

Devices that extend into a fluid-containing vessel are commonly used to mix large amounts of fluid. In such applications, it is common to include within the fluid-containing vessel one or more baffles to control vortexing and to direct the fluid toward the agitator and away from the container walls. Baffles may be considered to be static obstructions placed in the line of flow of a mixing fluid.

Baffles are designed for specific purposes and to be compatible with the particular agitator employed and the particular fluids to be processed. They may serve different functions in different applications. In the past, specific baffles have been designed to promote the formation and maintenance of emulsions, to decrease surface disturbances, and to minimize foaming. In addition, a multitude of baffle designs exist directed to aid mixing, to facilitate heat transfer, to maintain suspensions, to improve gas absorption by fluids, etc. However, a baffle is no more than a flow deflector, designed to break up the rotary swirl produced by a rotating mixing device. Therefore the subject baffle is suitable for any of the above enumerated functions.

The most commonly used baffle is the sidewall baffle which consists of one or more projections perpendicularly fixed to the inner wall of a vessel at an obstructing angle to the flow path of a liquid.

Another prior-art baffle is the "beaver tail" baffle, which is a generally vertically positioned member (detachably suspended within the liquid) having a flat or paddle-shaped configuration at its lowermost portion.

Yet another baffle is the "finger" baffle, which is a generally vertically positioned member having a plurality of elements or fingers disposed laterally with respect to the vertical members at angles calculated to perform a particular deflecting function.

In the chemical and pharmaceutical industries glass-coated metals are widely used as construction materials for apparatus that requires a combination of high strength, exceptional corrosion resistance, and anti-adherence characteristics. In such applications, it is desirable to glass coat the baffles as well as the inner walls of the mixing vessels; however, serious fabrication and maintenance problems arise in the use of glass-coated metals that are not present in metallic systems. These problems include (a) the tendency of glass coatings upon narrow edges to crack, (b) the need to maintain and not disturb the integrity of the vessel's glass lining and (c) the tendency of glass coatings to craze or crack when subjected to flexing.

Although sidewall baffles are generally considered most efficient, and are widely used in metal vessels, these baffles extend from the wall at a sharp angle, and include narrow edges. It is thus apparent that in the use of sidewall baffles, were they glass coated, two of the problems mentioned above present serious difficulties. Attaching these baffles to the wall of a glass-lined vessel at the required sharp angle disturbs the glass lining of the vessel and thus exposes metal to any corrosive medium within the vessel. Furthermore, the narrow edges of the sidewall baffle are highly subject to cracking and crazing of any glass coating deposited thereon, thus exposing metal to any corrosive medium within the vessel.

In view of the above, the approach used in the enameling art has been to suspend baffles from a nozzle in the head of the vessel rather than to fix them to the vessel wall. Although this approach eliminates disturbance of the vessel lining and simplifies fabrication of the baffle and the vessel, additional problems now present themselves. Namely, the baffle, hanging from the head of the vessel is unsupported at its bottom, is subjected to high cantilever forces by the motion of the swirling liquid and thus must be designed to provide adequate rigidity to resist these forces. Furthermore, it is known to the art that the most effective and consistent baffling is achieved by maintaining a certain relationship between the width of the baffles and the size of the vessel in which they are used, usually a ratio of baffle width to vessel diameter of from $\frac{1}{10}$ to $\frac{1}{12}$. It follows that in an ideal situation the larger the diameter of the vessel, the wider the baffle should be. However, as the width of the top supported baffle increases, the forces exerted upon the surface in the flow path of the fluid will tend to twist the baffle, and thus cause it to flex. This flexing will, in turn, promote a tendency for the glass lining to crack and craze. It is thus apparent that the use of a top supported baffle, per se, has not completely solved the peculiar problems inherent in the use of a glass-coated baffle. Therefore, the object of this invention is to provide a baffle that is easily fabricated and does not disturb the integrity of the vessel lining, yet is sufficiently rigid for use in a turbulent fluid and at an effective width approaching the theoretically ideal width.

A further difficulty encountered with prior art glass coated baffles, such as the D baffle disclosed in U.S. Patent 3,265,368, in the name of Ray J. Nocera, has been their inability to provide adequate mixing turbulence when employed in a mixing kettle containing a relatively small volume of fluid to be mixed. This commonly occurs during filling and emptying operations and when half or quarter batches are processed. Therefore, another object of this invention is to provide a baffle which is peculiarly suited to provide turbulence in a fluid being agitated when the level of such fluid is low, such as when it may be just above the level of rotation of an agitator blade within a mixing tank, or during filling and emptying operations of such fluid from a mixing tank or in the mixing of quarter or half batches of fluid.

It has now been found that the foregoing difficulties are overcome and the objects of this invention are achieved by employing a baffle comprising a mounting member and a plurality of rounded, laterally spaced and substantially parallel members joined one to another at one end. The cross-sectional widths of each of the various members of this baffle are relatively small, and thus the fabricating problems commonly associated with increasing the individual widths of baffles are now minimized; the effective width of this baffle is the sum of the widths of each of the parallel members. This permits simple dimensional scale-ups to provide any dimensions needed for maximum efficiencies in mixing even for the largest of vessels.

A baffle constructed according to the present teachings mixes at least as efficiently as a solid baffle of similar outside configuration but having no intermediate space as is here present between vertical members. In addition, the present baffle has the several advantages of being easy to fabricate and to coat with glass, and yet provides very substantial turbulence in fluids which are at a low volume level within the mixing vessel such as occurs during filling or emptying operations or in the use of half or quarter batch volumes. Furthermore, this baffle effectively divides the circular flow pattern of fluids being mixed into a plurality of streams of different flow velocities, and thus creates turbulence that not only far exceeds that due to use of its solid counterpart, but also that due to use of the prior art D baffle hereinbefore mentioned and especially so at the aforementioned low levels of fluids often used within mixing vessels. The space between the parallel vertical members of the present baffle acts as a Venturi passage over the full length of the baffle. The fluid flow therethrough is thus substantially increased over fluid flow streaming around the outer faces of the baffle members, thus creating yet additional and substantial turbulence, the several streams having different flow velocities. The accelerated flow therethrough may be termed "Venturi" flow and the turbulent mixing provided thereby may be termed "Venturi" mixing.

Moreover, baffles according to this invention require less structural materials in fabrication to provide a baffle with a given turbulence and mixing to effect and thus provide increased efficiencies and economies in operation.

The mutually joined ends of the mounting member and spaced members of this baffle impart a sufficient transverse rigidity to the baffle to prevent flexing and thus to protect the integrity of the glass coating. Additionally the transverse joining portion acts as a baffle surface which aids in creating turbulence when the fluid level is above the level of the joined ends.

Other objects and advantages of this invention will be particularly set forth in the claims and will be apparent from the following description, in which:

Figure 1:
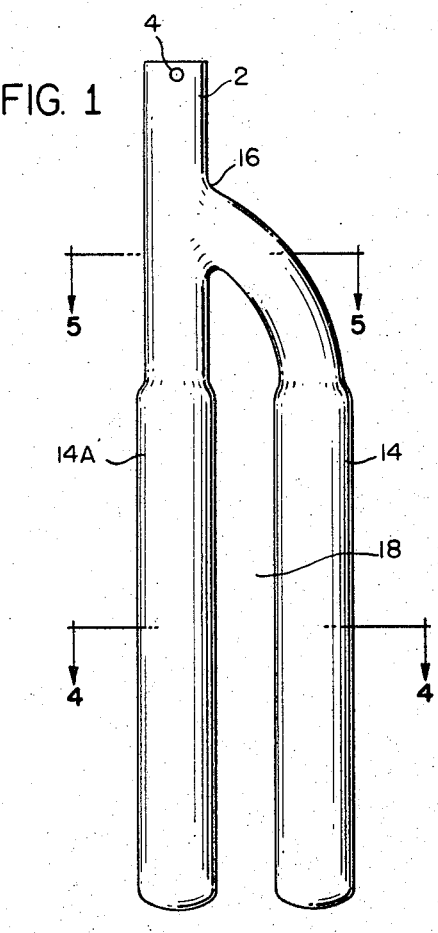
FIGURE 1 is an elevational view of a baffle according to the present invention.

Referring to the drawings, a preferred embodiment of a baffle of this invention is shown. This embodiment comprises two spaced apart members that form a substantially h-shaped baffle when in combination with a cylindrical mounting member used to suspend the baffle within the mixing container. It is to be understood that any suitable prior art mounting means may be used in combination with the mounting member for adjusting the orientation of the baffle within the vessel.

The mounting member 2 is substantially cylindrical in external configuration and is provided with holes 4 adapted for the insertion of bolts 6 whereby the entire baffle may be secured to a nozzle 8 provided in the head of vessel 10. Mounting may include provision of a stuffing box 12 or another suitable sealing means to insure the integrity of the fluid being mixed and the glass lining and closure of the vessel during the mixing operation.

The spaced members 14 may be formed from sections of cylindrical metallic tubing or rod or any other material of construction capable of receiving a glass coating. After formation of the h-shape, in the described embodiment, by joining members 14 to mounting member 2 at point 16, a portion of the tubing or rod generally including the spaced apart substantially parallel portions of the h may desirably be partially flattened as shown in FIGURE 4 to provide a generally oval-shaped configuration and thus an increased baffle surface.

When the structural portions of the baffle have been joined and, optionally, flattened to ovals, one or more continuous layers of glass or vitreous enamel are applied and fixed to the surface to provide a smooth, corrosion resistant surface.

Figure 2:
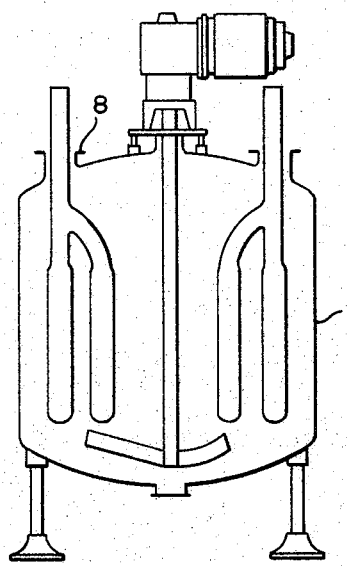
FIGURE 2 is an elevational view of a vessel containing baffles according to the present invention.
Figure 3:
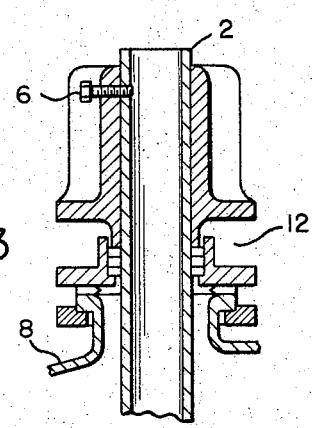
FIGURE 3 is a fragmentary elevational cross-sectional view showing the mounting of a baffle of the invention in a vessel.
Figure 4:
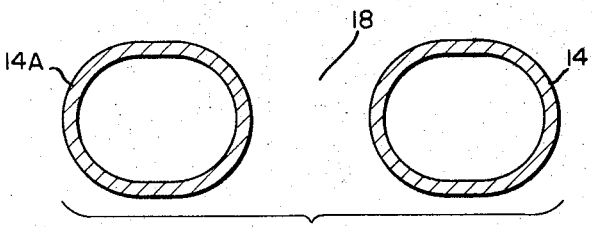
FIGURE 4 is a cross-sectional view of the plurality of flattened oval shaped baffle members of the embodiment shown in FIGURE 1 taken along line 4—4.
Figure 5:
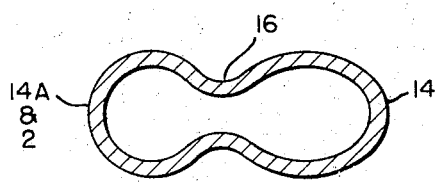
FIGURE 5 is a cross-sectional view at the point of joining of the mounting member and the plurality of spaced baffle members of the embodiment shown in FIGURE 1 taken along line 5—5.

The preferred embodiment as illustrated in the drawings is an h shaped configuration in which the parallel portions of the spaced members are flattened to form an oval-shaped section as shown in FIGURES 1, 2 and 4. However, since the avoidance of sharp corners is necessary to prevent the glassing difficulties discussed above, the exterior surfaces remain rounded.

It has been found that although an h shaped configuration is most advantageous to achieve the basic objects of our invention, e.g. maximum baffling width and improved baffling without sacrificing the structural strength of the glass coated baffle even at low fluid volumes, baffles of this invention are not limited to an h shaped configuration. Accordingly, the use of more than two spaced members joined at one end to a mounting member is within the scope of the invention. Moreover, such joining may be direct or through means of some rounded transverse member, so long as prohibited sharp angles and narrow edges are avoided.

An important factor that must be considered in any mixing process is power consumption. When baffles are absent or inadequate baffling is provided, rotary motion or swirl of the fluid is set up wherein rotary flow is essentially uniform throughout the flow front. Less power is consumed under these conditions than is consumed when vertical currents or turbulence are present. Therefore, to measure the effectiveness of a baffle, it is customary to observe its effect upon the power consumption. It is preferable to measure power consumption over an increasing range of power input. This may be measured in horsepower or equivalently in power numbers. If sufficient power is applied swirl, vortex, and air entrapment can be obtained even with the best of baffles, however, the more effective the baffle the greater will it retard such effects at higher power inputs.

Tests conducted with a three blade, oval glass coated retreat curve agitator in 100 gallon vessel containing fluids of various viscosities, denoted by Reynolds numbers, and employing a two horsepower variable speed drive system for turning the agitator, and one or two baffles of various types mounted as illustrated in the accompanying drawings, are shown in the following table. It compares the power numbers obtained, which numbers were measured with torque meters accurate to $\pm 5\%$ relative. In the art, power numbers are directly proportional to horsepower input and are related by the equation.

Power number $$= \frac{32.2 \times \text{horsepower input}}{\text{Specific gravity} \times \text{r.p.m. of} \times \text{diameter of} \atop \text{of Fluid} \quad \text{agitator} \quad \text{agitator}}$$

The higher the power number the better the baffling in otherwise equivalent tests. Various liquids of widely different Reynolds numbers were used in these tests, i.e. Reynolds numbers of $1 \times 10^4$ which corresponds to that of fluids having the viscosity of a heavy mineral oil, to Reynolds numbers of $1 \times 10^6$ which correspond to that of fluids having the viscosity of water or dilute aqueous solutions. The table compares the power numbers obtained in otherwise equivalent systems with two "finger" baffles, one h baffle, two h baffles, and four sidewall baffles. The latter is considered the standard in the art which provides the maximum turbulence and power consumption and thus the best mixing. The tests were conducted using a full liquid batch of 100 gal. For each viscosity, that is to say Reynolds No., the same type of liquid was used so that realistic comparisons would be made of power numbers among the various baffles compared. They clearly demonstrate the superiority of h baffles to "finger" baffles, and the h baffle values approach or occasionally exceed the power consumption values attained by 4 "sidewall" baffles, the standard of the art.

POWER CONSUMPTION OF BAFFLES, IN POWER NUMBERS WITH FLUIDS OF DIFFERENT REYNOLDS NUMBERS

| Type of Baffle | | | |
|---|---|---|---|
| Suspended | | | Sidewall |
| Finger | h | h | |
| Number of Baffles | | | |
| 2 | 1 | 2 | 4 |
| (Power Numbers) | | | |
| Reynolds No.: | | | |
| $1 \times 10^4$ — 0.430 | 0.480 | 0.540 | 0.520 |
| $1 \times 10^5$ — 0.385 | 0.385 | 0.440 | 0.440 |
| $2 \times 10^5$ — 0.345 | 0.345 | 0.405 | 0.405 |
| $3 \times 10^5$ — 0.300 | 0.300 | 0.360 | 0.360 |
| $4 \times 10^5$ — 0.260 | 0.260 | 0.320 | 0.320 |
| $5 \times 10^5$ — 0.235 | 0.235 | 0.285 | 0.285 |
| $6 \times 10^5$ — 0.220 | 0.220 | 0.260 | 0.265 |
| $7 \times 10^5$ — 0.210 | 0.210 | 0.250 | 0.255 |
| $8 \times 10^5$ — 0.205 | 0.205 | 0.245 | 0.250 |
| $9 \times 10^5$ — 0.200 | 0.200 | 0.241 | 0.247 |
| $1 \times 10^6$ — 0.200 | 0.200 | 0.240 | 0.245 |

In addition to measurements of power input, the relative effectiveness of baffles is commonly determined by visual observation of the agitation effects. The flow pattern produced by two h baffles exhibited a high velocity at the wall of the vessel, high turbulence behind the baffle, accelerated flow called "Venturi" acceleration through the space between the members and a powerful top-to-bottom turnover. Vortex control was excellent and agitation effect approached or occasionally exceeded that of a four sidewall baffle system. Each h baffle divided the mixing liquids into three streams of different velocities.

Additional tests were conducted with both larger and smaller vessels that substantiated the superior performance of the subject baffle.

Further tests were made comparing the mixing ability of two h baffles with two D baffles, set in comparable vessels as shown in FIG. 2, at comparable liquid levels, e.g. quarter-batches, half-batches and full batches. Although the h baffles performed with at least as good mixing properties as D baffles when full batches of liquid were tested, with quarter and half batches the h baffles showed markedly superior mixing to that showed by the D baffles. It is believed that the superior mixing and prevention of vortexing of liquids mixed at low volume level shown by the h baffles are due to the open terminal ends of the h baffles, which ends divide even low levels of mixing liquid into three streams of different velocities, the middle stream showing "Venturi" acceleration. The D baffles at these low levels divide the mixing liquid into only two streams due to the joined ends of the baffle members, and thus exhibited no "Venturi" acceleration.

Although no data is here provided detailing specific dimensions of baffles of the subject invention, such information is readily determinable by those skilled in the art. For typical applications one may use the general rule-of-thumb wherein 4 equally spaced baffles substantially extending the full length of the vertical sides, each having in total a width $1/10$ to $1/12$ of the vessel diameter is considered standard. But such rules are arbitrary and generally it is recognized in the art that the most efficient baffling for any given fluid most desirably is determined empirically.

Baffles according to this invention also can be used as heat transfer surfaces, and may be used on existing vessels without vessel re-design. The glass coating on baffles of this invention permits effective baffling even in highly corrosive mediums and where it is not advisable to disturb the integrity of the tank lining. Although this baffle is shown with an impeller type agitation device, its use is not limited thereto and may be used with other mixing devices such as turbines. Modification of the baffle elements to include thermometer wells and the like may be made in accordance with well known prior art practice.

The term glass coating as used herein includes glass or ceramic coatings, whether amorphous or devitrified.

Although the invention has been illustrated by a particular preferred embodiment, it is to be understood that such embodiment is intended merely to be illustrative, not limiting, and that various modifications that will become apparent to those skilled in the art fall within the scope of this invention and the appended claims.

We claim:
1. In combination with a vessel having mixing means, a baffle, comprising
   (a) a mounting member adjustably mounted outside said vessel and adapted for extending into said vessel, and
   (b) a plurality of rounded spaced members substantially parallel intermediate their ends joined to said mounting member and each other at one end, spaced apart at their other end and extending into the vessel, the portions of said baffle within the vessel being glass coated.
2. Apparatus according to claim 1 wherein said spaced members are in the same plane, the substantially parallel portions of said spaced members are oval shaped, and the major axes of said oval-shaped members are in said plane.
3. Apparatus according to claim 1 comprising two spaced members joining said mounting member and each other to form an h-shaped member.
4. Apparatus according to claim 3 wherein said spaced members are in the same plane, the substantially parallel portions of said spaced members are oval shaped, and the major axes of said oval-shaped members are in said plane.

References Cited
UNITED STATES PATENTS

| 2,108,482 | 2/1938 | Greene | 259—107 |
| 2,852,238 | 9/1958 | Varkony | 259—134 X |
| 3,265,368 | 8/1966 | Nocera | 259—108 |

WALTER A. SCHEEL, *Primary Examiner.*

R. W. JENKINS, *Assistant Examiner.*